No. 791,045.

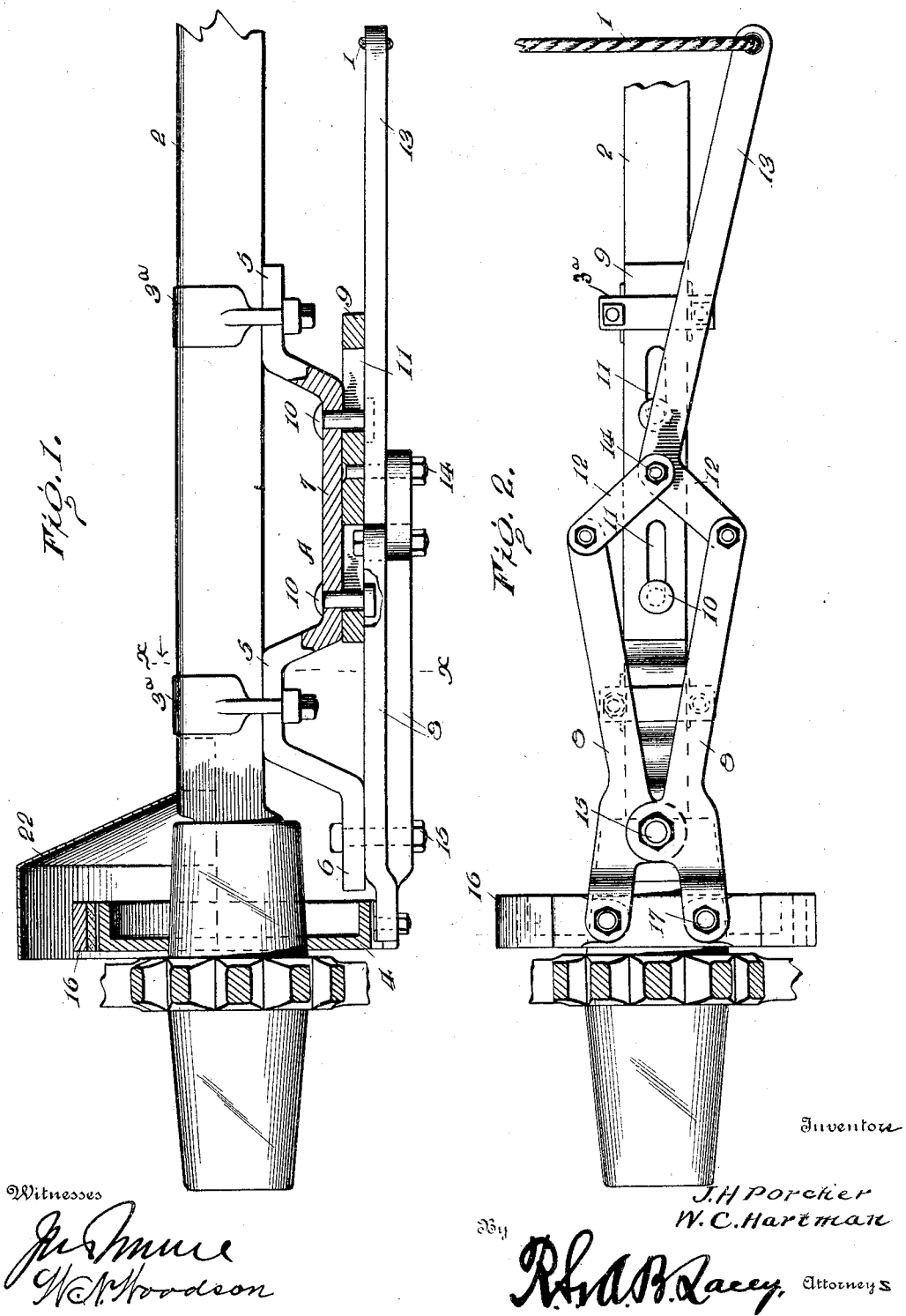

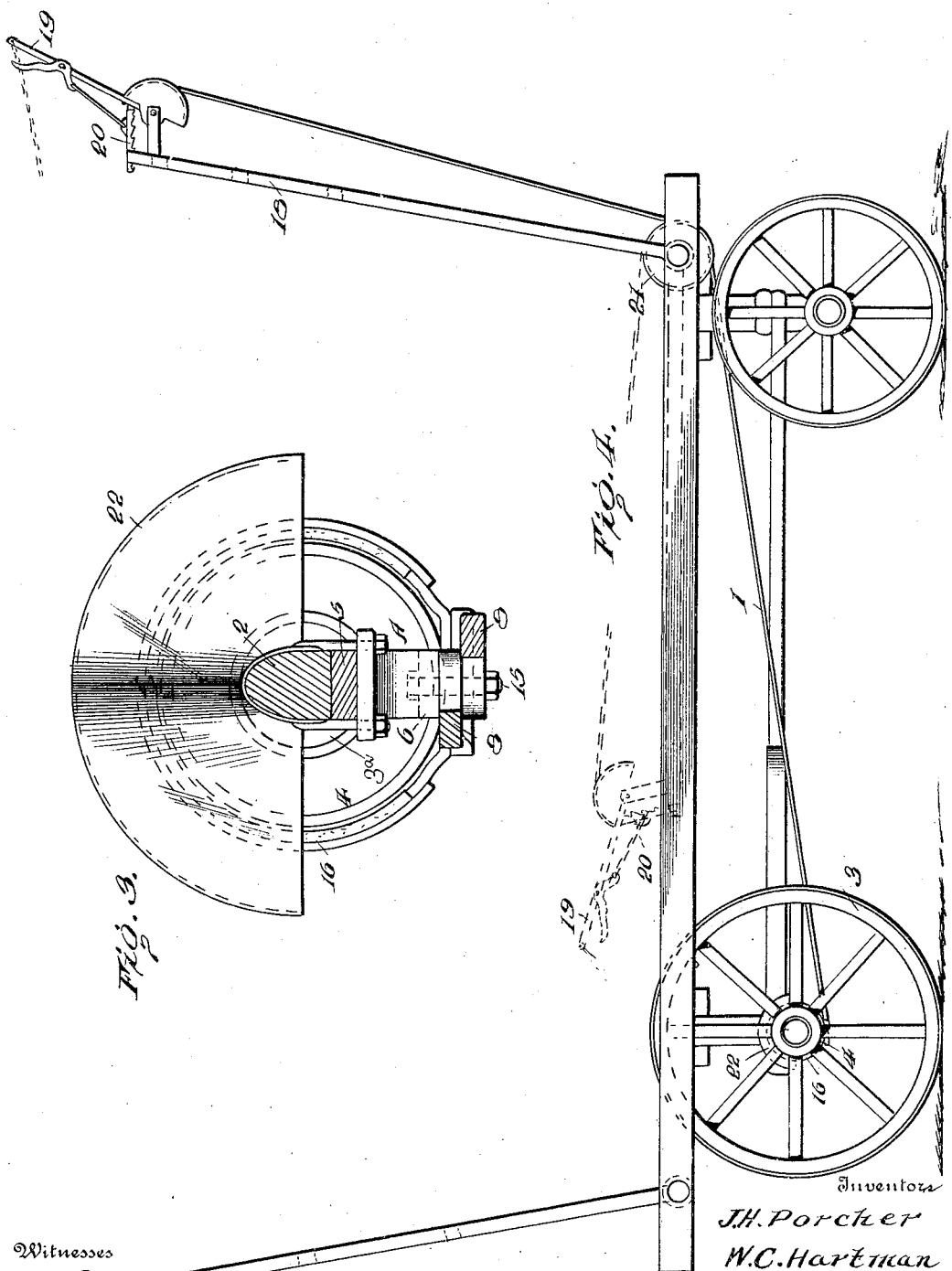

Patented May 30, 1905.

UNITED STATES PATENT OFFICE.

JACOB H. PORCHER AND WILLIAM C. HARTMAN, OF NEW COMERSTOWN, OHIO.

VEHICLE-BRAKE.

SPECIFICATION forming part of Letters Patent No. 791,045, dated May 30, 1905.

Application filed February 1, 1905. Serial No. 243,634.

*To all whom it may concern:*

Be it known that we, JACOB H. PORCHER and WILLIAM C. HARTMAN, citizens of the United States, residing at New Comerstown, in the county of Tuscarawas and State of Ohio, have invented certain new and useful Improvements in Vehicle-Brakes, of which the following is a specification.

This invention relates to brake apparatus designed most especially for road-vehicles, and is directed to the type of mechanism utilizing a strap or band and a circular coöperating brake member.

The invention relates more particularly to the mountings and general arrangement of the parts whereby the brake may be firmly set, the faces of the brake elements come squarely together, and the operation rendered comparatively easy and convenient.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a detail view of a portion of an axle, showing the hub of a wheel and illustrating the application of the invention. Fig. 2 is a view of the parts shown in Fig. 1 as seen from the lower side. Fig. 3 is a cross-section on the line *x x* of Fig. 1 looking in the direction of the arrows. Fig. 4 is a side view of a hay-wagon provided with a brake mechanism constructed in accordance with this invention.

Corresponding and like parts are referred to in the following description and indicated in all the views of the drawings by the same reference characters.

The brakes are applied to the hind wheels of the vehicle in the accustomed manner and are adapted to be operated by means of a cable or chain 1, extended within convenient reach of the driver. The rear axle 2 is provided at each end with a suitable wheel 3, with which is connected a circular brake member 4 of any desired construction. The brake member 4 may be attached to the hub of the wheel or form a part of the latter, as found most advantageous in construction, the purpose being to have the brake member and wheel rotated as one part. A support A is secured to the axle 2 by means of clips 3 or other suitable fastenings, and consists of a bar or plate having portions deflected to form the attaching parts 5 and the supporting parts 6 and 7. The attaching parts 5 are in longitudinal alinement and bear against the under side of the axle 2, whereas the supporting parts 6 and 7 are out of line, the part 6 receiving the pivoted brake-actuators 8 and the part 7 receiving a slide 9, connected thereto by bolts or fastenings 10 passed through slots 11 of the slide 9. Toggle-links 12 connect the inner ends of the pivot brake-actuators 8, and an arm 13 projects from one of the toggle-links 12 and is adapted to receive the power expended for operating the brake when required. The toggle-links 12 are pivotally connected to each other and to the slide 9 by means of a suitable pivot-fastening 14. The brake-actuators 8 are pivotally connected to each other and to the part 6 of the support A by means of a bolt or analogous fastening 15. The brake band or strap 16 encircles the brake member 4, and its end portions are loosely connected to the outer extremities of the brake-actuators 8 by means of suitable fastenings 17.

The brake-actuators 8 are pivoted near one end, as shown at 15, and their outer arms are comparatively short and their inner arms of considerable length, with the result that the power is augmented by the difference in the leverage of the arms. Inasmuch as the fulcrum or pivot-fastening 15 is fixed, it is essential to provide for movement of the pivot-fastening 14, and this is accomplished by having the same connected to the slide 9. As the inner ends of the brake-actuators 8 are spread or brought together the pivot-fastening 14 correspondingly moves toward or away from the pivot-fastening 15, due to the rectilinear movement of the slide 9.

When the brake is applied to a hay-wagon, as shown in Fig. 4, the front standard 18 is provided at its upper end with the operating-lever 19 and with a toothed bar 20, adapted to engage over a part of the standard, so as to hold the operating-lever in the adjusted position. The cable or chain 1 is connected to the lever 19 in such a manner as to be drawn upon when operating the lever to apply the brakes. A guide-pulley 21 is mounted in line with the axis of the standard 18. Hence the brakes may be applied in any position of the standard, as will be readily comprehended.

A suitable housing 22 extends over the upper portion of the brake members 4 and 6 to prevent accumulation of mud or other matter thereon.

Having thus described the invention, what is claimed as new is—

1. In brake apparatus, the combination of a circular brake member, a coöperating flexible brake element, brake-actuators pivoted between their ends and connected at one end to the said flexible brake element, toggle-links connecting the opposite ends of the brake-actuators, a slide, means pivotally connecting the toggle-links to each other and to said slide, and an arm extended from one of the toggle-links and adapted to have the power applied thereto for setting the brake, substantially as set forth.

2. In brake apparatus, the combination of a circular brake member, a coöperating band or flexible brake element, a support having deflected parts, brake-actuators connected at one end to the respective extremities of the flexible brake elements, means pivotally connecting the brake-actuators to one of the deflected parts of the support, toggle-links connecting the opposite ends of the pivoted brake-actuators, a pivot-fastening connecting said toggle-links and having a slide connection with the outer deflected portion of said support, and an arm extended from one of the toggle-links and adapted to have the power applied thereto, substantially as set forth.

3. In brake apparatus, the combination of coöperating brake members, consisting of a circular and a flexible element, a support, brake-actuators pivotally connected to said support and having loose connection with said element, toggle-links connecting the opposite ends of the brake-actuators, a slide having positive connection with said support and movable with reference thereto, means pivotally connecting said toggle-links to each other and to said slide, and an arm extended from one of the toggle-links and adapted to have the power applied thereto, substantially as set forth.

4. In combination, an axle provided with a wheel, a circular brake member rotatable with the wheel, a brake-band or flexible element, a support deflected to form attaching parts and supporting parts, means for securing said support to the axle, brake-actuators pivotally connected to one of said supporting parts and loosely connected with the flexible brake member, a slide connected to the other supporting part, toggle-links connecting the inner or free ends of the brake-actuators, a pivot-fastening connecting the toggle-links to each other and to said slide, and an arm extended from one of the toggle-links and adapted to have the power applied thereto, substantially as set forth.

In testimony whereof we affix our signatures in presence of two witnesses.

JACOB H. PORCHER. [L. S.]
WILLIAM C. HARTMAN. [L. S.]

Witnesses as to Jacob H. Porcher:
BEN BARNHILL,
T. J. RUSSELL.

Witnesses as to William C. Hartman:
F. J. KELLER,
ALEXANDER L. HIRSCHBERG.